March 8, 1938.                C. C. FARMER                2,110,701
                    COMPRESSOR SUSPENSION DEVICE
                        Filed Sept. 4, 1935
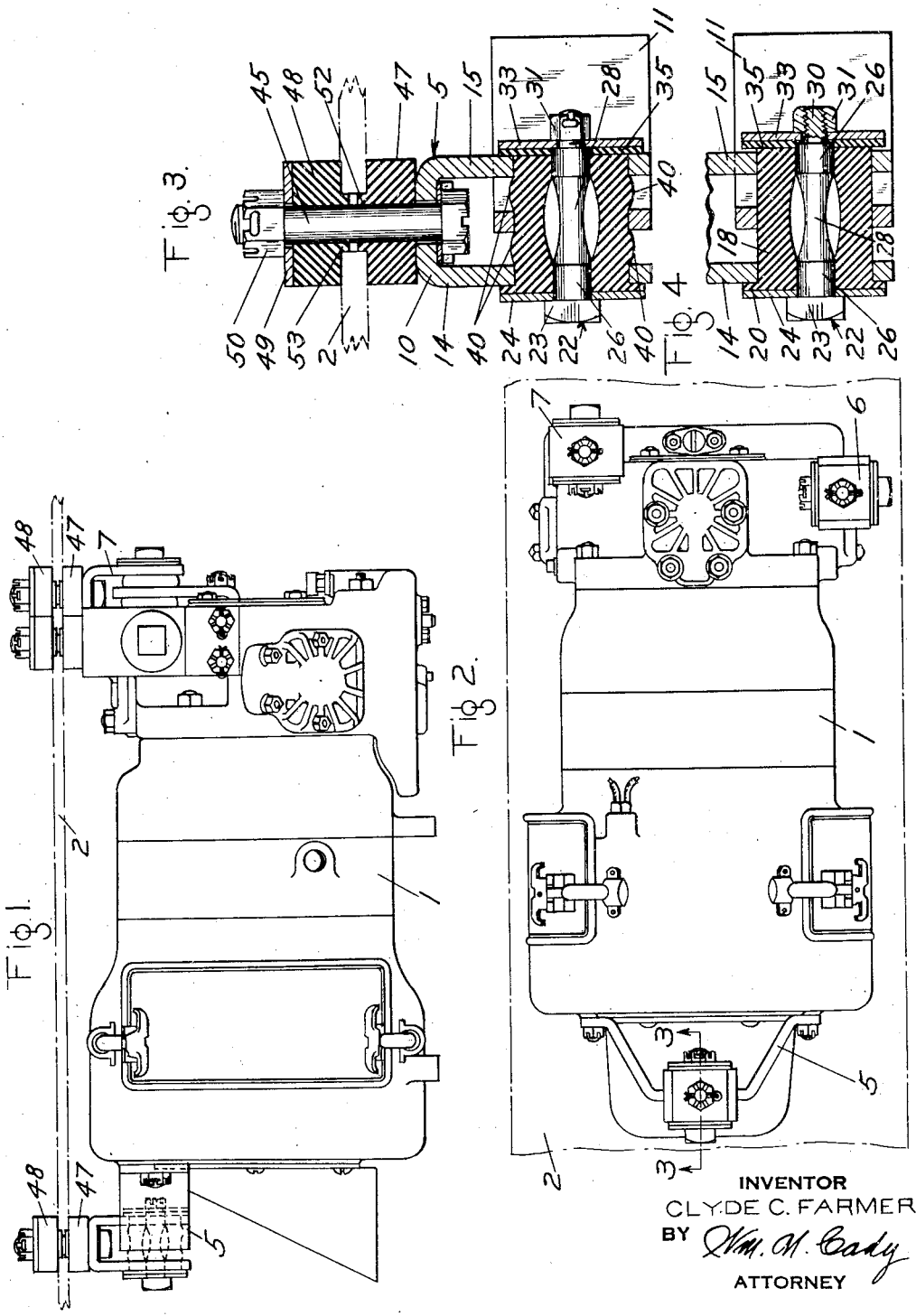
INVENTOR
CLYDE C. FARMER
BY Wm. N. Cady
ATTORNEY Patented Mar. 8, 1938

2,110,701

UNITED STATES PATENT OFFICE 2,110,701

COMPRESSOR SUSPENSION DEVICE

Clyde C. Farmer, Pittsburgh, Pa., assignor to The Westinghouse Air Brake Company, Wilmerding, Pa., a corporation of Pennsylvania Application September 4, 1935, Serial No. 39,124

8 Claims. (Cl. 248—18)

This invention relates to resilient supporting means and more particularly to means adapted to be employed to support a device so as to minimize the transmission of noise and vibration from the device to the supporting structure.

It is customary to mount the air compressors which are employed on certain types of vehicles, such as traction cars, beneath the floor of the vehicle, the air compressor being supported from a portion of the vehicle body.

In order to minimize the transmission of noise and vibration from the compressor to the vehicle body it has been proposed to support the compressor through blocks of resilient material, such as rubber composition.

The supporting means heretofore provided have had the structure arranged so that the resilient members have been subject to compression, and it has been found that these members were so firmly compressed that they lost most of their resiliency, and hence their ability to absorb noise and vibration, and that as a result noise and vibration produced by operation of the compressor were transmitted to the vehicle body with little reduction in magnitude.

It is the principal object of this invention to provide improved resilient supporting means adapted to be employed to support a device from a supporting body to substantially prevent the transmission of noise and vibration from the device to the supporting structure.

A further object of the invention is to provide supporting means of the above type, and which employs resilient members which in use are subject to forces other than that of compression.

Another object of the invention is to provide resilient supporting means which operates to limit movement of the supported device relative to the supporting structure.

A further object of the invention is to provide improved resilient supporting means.

Other objects of the invention and features of novelty will be apparent from the following description taken in connection with the accompanying drawing, in which Fig. 1 is a side elevational view of a compressor which is supported by supporting means embodying this invention;

Fig. 2 is a top plan view of the compressor shown in Fig. 1;

Fig. 3 is an enlarged sectional view taken substantially along the line 3—3 of Fig. 2; and Fig. 4 is a fragmentary sectional view, similar to Fig. 3, and showing the supporting unit before the assembly of the unit is completed.

Referring to the drawing, a compressor unit of a type adapted for use on traction vehicles is illustrated and is indicated generally by the reference character 1, and as shown comprises an air compressor and a driving motor therefore. The compressor unit 1 is mounted beneath the body of the vehicle, being suspended from the floor 2 through supporting devices indicated by the reference numerals 5, 6 and 7.

As is best shown in Fig. 2 of the drawing the supporting device 5 is secured to one end of the compressor unit adjacent the mid portion thereof, while the supporting devices 6 and 7 are secured to the other end of the compressor unit adjacent opposite sides thereof.

The supporting devices 5, 6 and 7 are similar in construction and the construction of the supporting device indicated generally by the reference character 5 is shown in detail in Figs. 3 and 4 of the drawing.

As shown, the supporting device 5 comprises a member indicated generally by the reference character 10 and associated with the support, and a member indicated generally by the reference character 11 and associated with the device to be supported.

The member 10 is provided with horizontally spaced portions 14 and 15, while the member 11 has a portion which is disposed between the spaced portions 14 and 15, being spaced therefrom a substantial distance.

The spaced portions 14 and 15 and the intermediate portion 11 have substantially aligned openings therein, and a body indicated generally by the reference numeral 18 and constructed of a suitable resilient material, such as moulded rubber composition, extends through the openings in these members. The body 18 is preferably formed so as to have substantially the same external diameter as the openings in the members 14, 15 and 11, as is best shown in Fig. 4 of the drawing, and is provided adjacent one end thereof with an annular flange 20 which engages the face of one of the spaced portions of the member 10.

The body 18 is preferably formed so as to be somewhat longer than the distance between the opposite faces of the spaced portions 14 and 15, so that when it is placed in the openings in these portions with the flange 20 in engagement with the face of one of these portions the other end of the body will project from the face of the other portion, as is clearly shown in Fig. 4 of the drawing.

The body 18 has an aperture extending therethrough and a bolt 22 is positioned in this aperture. The bolt 22 has a head 23 formed on one end thereof and a washer 24 of substantially the same diameter as the flange 20 is interposed between the head 23 and the flange 20.

The bolt 22 has adjacent each end thereof portions 26 which are of substantially the same diameter as the portions of the hole in the end portions of the body 18, and the bolt has adjacent the mid-portion thereof a portion of reduced diameter indicated at 28.

In addition, the bolt 22 has on the end remote from the head 23 a portion 30 of reduced diameter which is threaded so as to receive a nut 31.

A washer 33 of substantially the same diameter as the washer 24 is fitted on the reduced portion 30 of the bolt 22, while a disc 35 constructed of resilient material is interposed between the washer 33 and the end of the body 18.

The hole through the body 18 is preferably enlarged in diameter adjacent its mid portion so that the thickness of the wall of the body 18 is reduced in the region which is engaged by the member 11.

When the nut 31 is tightened on the bolt 22 the washers 24 and 33 are drawn towards each other, thereby compressing the resilient body 18 axially, or in the direction of its length, and at the same time causing it to increase in size radially so that the body 18 tightly engages the walls surrounding the apertures in the portions 14, 15 and 11, and it also tightly engages the portions 26 of the bolt 22, while the member 35 will be pressed against the face of the portion 15.

As a result of the axial compression of the member 18 the portions thereof intermediate the member 11 and the spaced portions 14 and 15 will be expanded as indicated at 40 in Fig. 3.

After a certain amount of compression of the resilient body 18, the washer 33 will engage the shoulder on the bolt 22 between the portion 26 and the portion 30 thereof so as to prevent further compression of the resilient body 18, while the washers 24 and 33 prevent removal of the body 18 from the apertures in the portions 14, 15 and 11.

As is clearly shown in Figs. 3 and 4 of the drawing the central portion of the body 18 is spaced from the central portion 28 of the bolt, and it has been found that this relationship will be maintained even when the weight of the device to be supported is imposed on the body 18. This provides a yielding, resilient connection between the support and the body to be supported.

Means is provided to secure the member 10 to the support, and in the device shown in Fig. 3 of the drawing this means comprises a bolt 45 which extends through a hole in the member 10 and a hole in the floor 2 of the vehicle body, or a member associated therewith, and which has secured thereon a pair of blocks 47 and 48, which are constructed of a suitable resilient material, such as moulded rubber composition. The block 47 is positioned between the member 10 and the floor 2, while the block 48 is positioned on the opposite side of the floor 2 and has positioned on its upper face a washer 49 which is engaged by a nut 50. The blocks 47 and 48 are each provided with a portion of reduced diameter indicated at 52 and 53 respectively, and adapted to extend into the opening in the floor 2 through which the bolt 45 extends so as to maintain the bolt 45 in spaced relationship relative to the floor 2.

The supporting devices indicated by the reference numerals 6 and 7 are generally similar in construction to that indicated by the reference numeral 5, differing, however, from the device indicated by the reference numeral 5 in that they employ a slightly different form of bracket than that which is employed in the supporting device 5 and indicated by the reference numeral 11.

In the installation of the compressor on the vehicle, the supporting devices 5, 6 and 7 are arranged so that the axis of the body 18, and the bolt 22 employed therein, of one of these supporting devices extends substantially perpendicularly to the axis of the bolt and resilient body employed in other of the devices. Thus it will be seen in Fig. 2 of the drawing, that the bolt employed in the supporting device indicated by the reference numeral 6 extends in a plane substantially perpendicular to the plane in which the bolts employed in the supporting devices 5 and 7 extend.

This prevents movement of the compressor 1 longitudinally of the car as a result of the inertia of the compressor during starting and stopping of the vehicle, and also serves to maintain the spaced portions 14 and 15 and the intermediate portion 11 of the supporting devices in the proper spaced relationship.

While one embodiment of the improved resilient supporting means provided by this invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a supporting device, a member adapted to be associated with a support, a member adapted to be associated with a device to be supported, one of said members having horizontally spaced portions, the other of said members having a portion intermediate said spaced portions, said spaced portions and said intermediate portion having substantially aligned openings therein, a substantially tubular body constructed of resilient material positioned in said aligned openings, said body having an aperture extending therethrough, and a member positioned in said aperture, the portions of the body in the region of the spaced portions being in engagement with the walls of the openings in said spaced portions, and being in engagement with the member positioned in said aperture, the intermediate portion of said body being in engagement with the wall of the opening in said intermediate portion, and being spaced from the member positioned in said aperture.

2. In a supporting device, a member adapted to be associated with a support, a member adapted to be associated with a device to be supported, one of said members having horizontally spaced portions, the other of said members having a portion positioned intermediate said spaced portions, said spaced portions and said intermediate portion having substantially aligned openings therein, a substantially tubular body constructed of resilient material and positioned in said aligned openings, said body having an aperture extending therethrough, and a member positioned in said aperture, said member having a portion of reduced diameter intermediate its ends, the portions of the body in the region of the spaced portions being in engagement with the walls of the openings in said spaced portions and being in engagement with the member positioned in said aperture, the intermediate portion of the body being in engagement with the wall of the opening in said intermediate portion, and being spaced from the member positioned in said aperture.

3. In a supporting device, a member adapted to be associated with a support, a member adapted to be associated with a device to be supported, one of said members having horizontally spaced portions, the other of said members having a portion positioned intermediate said spaced portions, said spaced portions and said intermediate portion having substantially aligned openings therein, a substantially tubular body constructed of resilient material positioned in said aligned openings, said body having an aperture extending therethrough, and a member positioned in said aperture, said member having a portion of reduced diameter intermediate its ends, the aperture in the body having a portion of increased diameter located adjacent the reduced portion of the said member.

4. In a supporting device, a member adapted to be associated with a support, a member adapted to be associated with a device to be supported, one of said members having horizontally spaced portions, the other of said members having a portion positioned intermediate said spaced portions, said portions being spaced apart a substantial distance and having substantially aligned openings therein, a substantially tubular body constructed of resilient material and positioned in said aligned openings, said body having an aperture extending therethrough, and a member positioned in said aperture, said member having a portion of reduced diameter intermediate its ends, the aperture in the body having a portion of increased diameter located adjacent the reduced portion of the said member.

5. In a supporting device, a member adapted to be associated with a support, a member adapted to be associated with a device to be supported, one of said members having horizontally spaced portions, the other of said members having a portion intermediate said spaced portions, said spaced portions and said intermediate portion being spaced apart a substantial distance and having substantially aligned openings therein, a substantially tubular body constructed of resilient material positioned in said aligned openings, said body having an aperture extending therethrough, and a member positioned in said aperture, the portions of the body in the region of the spaced portions being in engagement with the walls of the openings in said spaced portions and being in engagement with the member positioned in said aperture, the intermediate portion of said body being in engagement with the wall of the opening in said intermediate portion and being spaced from the member positioned in said aperture.

6. In a supporting device, a member adapted to be associated with a support, a member adapted to be associated with a device to be supported, one of said members having horizontally spaced portions, the other of said members having a portion intermediate said spaced portions, said spaced portions and said intermediate portion being spaced apart a substantial distance and having substantially aligned openings therein, a substantially tubular body constructed of resilient material positioned in said aligned openings, said body having an aperture extending therethrough, a member positioned in said aperture, the portions of the body in the region of the spaced portions being in engagement with the walls of the openings in said spaced portions and being in engagement with the member positioned in said aperture, the intermediate portion of said body being in engagement with the wall of the opening in said intermediate portion and being spaced from the member positioned in said aperture, and means to compress said body in the direction of its length.

7. In a supporting device, a member adapted to be associated with a support, a member adapted to be associated with a device to be supported, one of said members having horizontally spaced portions, the other of said members having a portion disposed intermediate said spaced portions, said portions having substantially aligned openings therein, a substantially tubular body constructed of resilient material positioned in said aligned openings, said body having an aperture extending therethrough, said aperture having a region of larger diameter adjacent said intermediate portion, a member extending through said aperture, and means operating through said member for compressing said tubular body in the direction of its length and thereby pressing the ends of the said body into engagement with said member and with said spaced portions and to exert force on the central part of said body to cause it to expand radially outwardly away from said member and to press against said intermediate portion.

8. In a supporting device, a member adapted to be associated with a support, a member adapted to be associated with a device to be supported, one of said members having horizontally spaced portions, the other of said members having a portion disposed intermediate said spaced portions, said spaced portions and said intermediate portion having substantially aligned openings therein, a substantially tubular body constructed of resilient material positioned in said aligned openings, said body having an aperture extending therethrough, said aperture having a region of enlarged diameter adjacent said intermediate portion, a member extending through said aperture, said member having a region of smaller diameter intermediate the ends thereof, and means operating through said member for compressing said tubular body in the direction of its length and thereby press the end portions of the said body into engagement with said member and into engagement with said spaced portions, and to force the central part of the tubular body radially outwardly away from the region of smaller diameter of the said member and into engagement with said intermediate portion.

CLYDE C. FARMER.